United States Patent Office 3,443,961
Patented May 13, 1969

3,443,961
METHOD OF FREEZE-DRYING COFFEE
William W. Kaleda, Westwood, N.J., and Joe W. Johnson, Port Chester, N.Y., assignors to General Foods Corporation, White Plains, N.Y., a corporation of Delaware
No Drawing. Filed Jan. 29, 1965, Ser. No. 429,118
Int. Cl. A23f *1/08;* F26b *5/06*
U.S. Cl. 99—71                                   3 Claims

ABSTRACT OF THE DISCLOSURE

Freeze-dried coffee which has been aromatized is made more stable by reducing the vacuum to below 100 microns for at least 4 hours while drying to a terminal moisture of between 1% and 1.7%.

---

This invention relates to freeze-drying coffee under controlled conditions which produce a relatively stable soluble coffee of high aromatic content.

Coffee extract has been frozen and freeze-dried to produce soluble coffee. However, this type of product has not met with commercial success due to a stability problem in regard to flavor and moisture. Apparently, retention of aromatics during freeze-drying is so effective that a high fraction of unstable aromas are retained which quickly react with a small percentage of oxygen in the air to produce undesirable compounds having a rancid or uncoffee-like flavor. This reaction usually takes place in a matter of hours or several days (under normal packaging conditions encountered commercially) and renders the product completely unacceptable from a flavor standpoint. The addition of different levels of volatile aromas and coffee oils has served to only aggravate the flavor problem by adding to the level of unstable aroma compounds which are retained during freeze-drying of the coffee. Attempts to stabilize the aromatized freeze-dried coffee by use of flavor fixatives such as carbohydrates, sugars, starches, gums, etc. have not been successful. Also, freeze-dried coffee due to the porous nature of the product has tended to be very hygroscopic and has formed large unsightly clumps when stored for only a short time. The use of inert gas during processing and the use of desiccating agents to protect the product from moisture have not solved the caking problem.

It would, therefore, be desirable if freeze-dried coffee of improved flavor and aroma could be produced which could be stable under normal storage and package conditions encountered in commerce.

It has now been discovered that a stable, aromatic, freeze-dried coffee may be produced by a process which comprises cooling an aqueous extract of coffee from its ice point to below its eutectic point to form a frozen eutectic mixture of water, coffee solids and coffee volatiles, this frozen eutectic serving as a matrix for crystals of water ice distributed throughout the extract; subliming said crystals of water ice at a pressure of below 500 microns of mercury; and a condensing temperature of below —30° F.; and vacuum-drying said matrix to a moisture content of between 1 to 1.7% without melting said mixture, said pressure and temperature being reduced to below 200 microns and a condensing temperature of below —60° F. for at least 4 hours during the vacuum-drying step to thereby remove at least some of the unstable volatiles from said coffee.

During the sublimation stage and the vacuum-drying (desorption) stage of drying, it is essential that the dried portions of the frozen coffee extract be maintained at a product temperature of between 60° F. and 120° F., preferably 60° F. to 108° F., in order to preserve the desired flavor of the coffee.

As used in this application, "ice point" refers to that temperature at which the water present in coffee extract begins to crystallize as substantially pure water ice. "Eutectic point" means that temperature at which a specific mixture of coffee solids, volatile aromatics and water having the lowest melting point of any other mixture in the extract solidifies or melts. In effect, this temperature is the lowest possible melting point of any material contained in the extract. "Product temperature" as used herein means the temperature of the dried coffee extract, typically, the dried surface of extract which usually contains between 1 and 2.5% moisture.

"Sublimation" as used in this context refers to the vaporization of water ice crystals directly from the solid state to the vapor state without passing through an intermediate liquid state. "Vacuum-drying" or "desorption" as used here refers to that portion of the freeze-drying process wherein all of the water ice crystals have been sublimed and the eutectic mixture of coffee solids, aromatics and water is dried to a stable moisture content. This stage of drying need not be strictly sublimation since some evaporation of water from the liquid state may occur without melting the frozen extract. The desorption state of drying is usually reached when the water content of frozen extract is reduced to about 33% by weight moisture.

In freeze-drying the coffee extract, it is not necessary to operate at a vacuum of below 200 microns of mercury and a condenser temperature of below —60° F. during the entire desorption stage, but it is necessary that such vacuum be maintained for at least 4 hours in order to remove at least some of the unstable aromas present in the coffee which have been retained during the sublimation stage of drying. Also, if a volatile flavor fraction containing both stable and unstable volatile aromas is added to the extract prior to freezing and drying, this fraction will be modified to a more stable form by having some of its unstable aromas removed during drying.

The aroma fraction which is added to the extract is typically a volatile steam aroma obtained by steaming a bed of roasted coffee in order to obtain a reflux and rectification of the coffee. Such a process is described in U.S. patent to Mahlmann 3,132,947. This aroma is obtained by condensing the volatile steam fraction at temperatures of between 35° and 70° F. The ground coffee should be arranged in an elongated bed having a length at least 5 times greater than its width and the particle size of the coffee in said bed should be such that 90% of the coffee is retained on a 40 mesh U.S. Standard Sieve Screen. The aroma is usually added at a level of between 2 and 6% by weight of coffee solids in the extract. This aroma may also be added to extract which has been enhanced by addition of expressed coffee oil, preferably at a level of between 0.2 to 1.0% by weight of coffee solids. The coffee oil may be dispersed by homogenization prior to the aroma addition. In this manner, the homogenization step does not degrade the volatile aromas.

Other steam aromas which may be used include those obtained by the process described in the U.S. Patent to Lemonnier 2,542,119 and Cole 2,542,119. These aromas may also be blended with coffee oil and then added to the extract or added separately to extract having the coffee oil dispersed therein. Here also, homogenization may be used to achieve a good dispersion of the coffee oil in the extract prior to addition of the volatile aroma fraction.

In the vacuum-drying (desorption) stage of drying, it is necessary to dry the coffee extract to a level of below 1.7% moisture. At levels above this moisture range, it has been found that the soluble coffee product absorbs too much moisture during further processing and packing and deteriorates upon storage. During the drying, however, care should be taken not to dry the extract to a level of below 1% moisture since over-drying will cause an excess removal of aromatic materials including those which are essential to a good coffee flavor. Therefore, the extract should be dried to a moisture level of between 1.0 to 1.7% to thereby provide a relatively stable soluble coffee of acceptable flavor and stability.

After the extract has been dried, atmospheric oxygen and moisture exposure should be kept at a minimum during further processing and packaging in order to assure an in-package moisture level of less than 2.5% and an oxygen level of less than 2%, preferably less than 1%. In accomplishing this, it is necessary to "break" the vacuum in the freeze-drying chamber by the use of an inert gas, such as nitrogen, which serves to permeate the product and form a protective molecular film of inert gas thereon. Carbon dioxide, argon or other inert gas can be used for this purpose. In forming this protective coating or film it is preferable that the frozen coffee be pre-ground or granulated to the desired particle size prior to drying since each particle of dried coffee will then be more fully protected by the inert gas film during packaging and storage. In the case where the coffee extract is frozen into a slab, freeze dried in such form and then ground or subdivided to the desired particle size the advantages of the protective inert film may be lost. Moreover, in the case where the frozen slabs are subdivided or granulated to a mesh size distribution of between 10–90 mesh U.S. Standard Sieve prior to freeze drying, the granulated particles appear to dry to a more stable form, i.e., a case-hardened particle form which is more stable to moisture pickup. The product is preferably exposed to ambient conditions for a minimum of time which assures retention of a moisture level of below 2.5% moisture in the product. For example, when extract is dried to below 1.7%, blanketed with nitrogen and then exposed for 5 minutes to ambient conditions of 80° F. and a relative humidity of 70%, the dried product will absorb about 0.5–0.8% of moisture, will pick up about 0.2% moisture during packaging, and will develop about 0.2% moisture during storage due to organic reactions. If the moisture level of the dried product is not maintained at below 2.5%, the soluble coffee will cake rapidly upon storage into large clumps even in the presence of a dessicant such as silica gel.

This invention will now be described by reference to a specific example.

EXAMPLE

About 1400 pounds of green offee were introduced into a roaster of the type conventionally employed in the coffee industry. The coffee was roasted for about 18 minutes to a terminal roast temperature of 415° F. to yield approximately 1250 pounds of roasted coffee beans which were then ground to a particle size range whereat 95% remained on a No. 20 U.S. Standard Sieve Mesh Screen and 5% remained on a No. 8 U.S. Standard Sieve Mesh Screen. Approximately 200 pounds of this ground coffee was then introduced to fill a stainless steel extraction column, 15 feet high, 10 inches inner diameter. Steam at between 1–10 p.s.i.g. was introduced at the bottom of the column and the steam pressure maintained at input within this range throughout the steam flavor volatilization cycle, which lasted approximately 30 minutes. During this cycle approximately 40 pounds of steam was supplied to the column. The volatile materials passed out of the top of the column and into a multi-tube vertical condenser. The condenser was cooled with brine at a temperature of 35°–50° F. The aromatic volatiles were collected to 40°–50° F. and at substantially normal atmospheric pressure.

After removing the volatiles, the steamed coffee was subjected to aqueous extraction by the introduction of 5400 grams of an aqueous coffee extract produced by a plurality of previously separated extractions and having a solids content of about 26%. The extract was then divided into 2 portions, 1 portion (about 20%) was combined with expressed coffee oil obtained by pressing roasted coffee beans. The oil-extract mixture was then homogenized at about 1500 p.s.i.g. and then added back to the extract stream. The volatile steam aroma was then added to the extract at a level of about 3.6 ml. per pound of soluble solids. The expressed coffee oil was added at a level of about 0.4 grams per pound of soluble solids.

The aromatized extract was then frozen into a ½" thick slab of coffee by means of a stainless steel freezing belt which was cooled by contact with cold brine having a temperature of about −40° F. The belt was about 50 feet long and 20" wide. The extract was frozen to below its eutectic point of −13.5° F. in about 30 minutes and issued from the terminal portion of the freezing belt at a product temperature below −20° F. The frozen extract was removed in slab form at a dimension of about ½" x 40" x 20".

The slabs of frozen coffee extract were then placed in a freeze dryer equipped with horizontal shelves and an external condenser. The frozen extract was heated by platens spaced about $\frac{1}{16}$" from the frozen extract. A vacuum of 300 microns of mercury was drawn on the chamber, a condenser temperature of −40° F. was applied, and the platen temperature was raised to 120° F. The pressure was not allowed to rise above 500 microns. The condenser temperature of −40° F. was maintained for about 12 hours until the moisture of the coffee was reduced to about 10%. The platen temperature was then lowered to 95° F., the condenser temperature was lowered to −60° C. and the pressure reduced to below 150 microns. These conditions were maintained for about 5–6 hours until the coffee was dried to a moisture level of about 1.7%. The freeze drying chamber was released to atmosphere by injecting nitrogen into the system. The dry slabs of coffee were then granulated, further processed and packaged under a minimum of oxygen and moisture exposure. The dried product was not exposed to ambient conditions for more than 5 minutes prior to being packed in jars. The coffee was granulated to a size approaching that of roasted and ground coffee (90% on a 40 mesh U.S. Standard Sieve Screen) and sealed in glass jars containing less than 1% oxygen in the head space. In jar moisture of the product was 2.2%.

The freeze-dried coffee was stored at 95° F. for 3 months and, at the end of this time, exhibited no appreciable change in regard to flavor or caking.

A similar sample prepared under the same conditions but dried at a condenser temperature of −40° F. throughout the freeze-drying cycle, dried to a moisture content of 3% and packaged at 3.5 moisture, was found to have deteriorated both in regard to flavor and caking after only 2 weeks of storage.

While this invention has been described by reference to a specific example, it is understood to be limited only by the appended claims.

What is claimed is:

1. A process for producing a stable aromatized freeze-dried coffee which comprises removing a fraction of relatively unstable volatile aromas from roasted coffee, extracting the dearomatized coffee, mixing said unstable aroma fraction with said extract, freezing said extract to below its eutectic point, grinding said frozen extract to a granular particle size, freeze-drying said extract under conditions wherein water is sublimed at a pressure of between 100 and 500 microns for a major portion of the drying cycle and then water and some unstable aromatic compounds are removed for at least 4 hours at a pressure of below 100 microns until a terminal moisture of between 1% and 1.7% is reached, breaking said vacuum with an inert gas to form a protective film on said ground coffee, and then maintaining an oxygen reaction of below 2% and a moisture content of below 2.5% during further processing of the coffee.

2. The process of claim 1 wherein the aromas are steam aromas, the dried portions of extract are kept below 108° F. during drying, and the inert gas is nitrogen.

3. The process of claim 2 wherein the condenser temperature is about −40° F. while the ice is sublimed at 100–500 microns and about −60° F. while the water and unstable aromas are removed at below 100 microns.

References Cited

UNITED STATES PATENTS

| | | | |
|---|---|---|---|
| 2,509,681 | 5/1950 | Flosdorf | 99—206 |
| 2,563,233 | 8/1951 | Gilmont | 99—71 |
| 2,616,604 | 11/1952 | Folsom | 53—22 |
| 3,244,533 | 4/1966 | Clinton et al. | 99—71 |

MAURICE W. GREENSTEIN, *Primary Examiner.*

U.S. Cl. X.R.

99—199